Feb. 13, 1934.   H. A. DOUGLAS   1,946,965
LIGHTING SYSTEM FOR AUTOMOTIVE VEHICLES
Filed Oct. 14, 1931
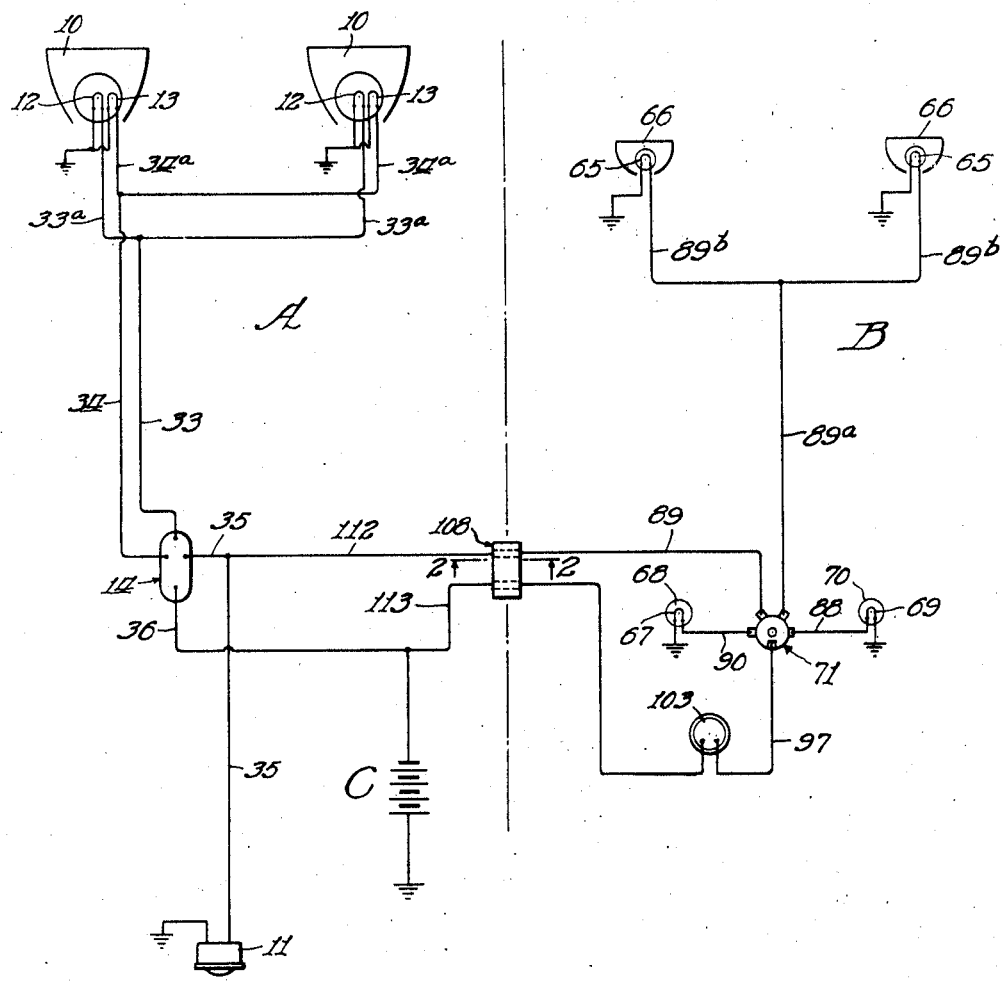
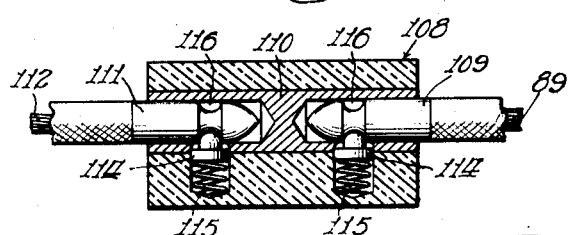
Inventor
Harry A. Douglas
By Langdon Moore
Atty.

Patented Feb. 13, 1934

1,946,965

UNITED STATES PATENT OFFICE 1,946,965

LIGHTING SYSTEM FOR AUTOMOTIVE VEHICLES

Harry A. Douglas, Bronson, Mich.

Application October 14, 1931. Serial No. 568,667

3 Claims. (Cl. 171—97)

This invention relates to lighting systems more particularly for automotive vehicles.

Among other objects the invention aims to provide two independent groups of electric circuits one upon the chassis of an automobile, for example, and the other upon the body of the vehicle. In one aspect of the invention, the two groups advantageously have a common source of electric current.

My invention is of particular utility in providing a simple and efficient system of circuit wiring for a vehicle, whereby the circuit wiring on the chassis includes a tail light and two selective pairs of driving lights, and the circuit wiring on the body includes parking lights, dash and service lights, and means are provided whereby the body wiring may be easily connected to the battery when the body of the vehicle is placed upon the chassis.

The invention also desirably includes separate switching mechanisms in each of the body and chassis wirings, the switching mechanism on the body being desirably hand-operated and the switching mechanism on the chassis being desirably foot-operated. Means are also included for connecting the tail light to each of the chassis and body switching mechanisms, whereby the tail light is lighted in the circuit completing position of either or both of the chassis and body switching mechanisms.

The invention will be more fully explained in connection with the accompanying drawing, in which—

Figure 1 is a wiring diagram of an automobile lighting system embodying my invention;

Figure 2 is a section taken on the line 2—2 of Figure 1 and showing one form of connecting means between the circuits.

Referring in detail to the figures of the drawing, I have shown two groups of electric wirings A and B. The A wiring may be advantageously laid on one structure, such as the chassis of an automotive vehicle, and the B wiring on the body of the vehicle, for example. The two wirings may be connected with a common source of current, such as one side of the battery C, which may be conveniently mounted on the chassis and grounded thereto.

The A, or in this instance the chassis wiring, may include filaments for two head lamps 10 and a tail lamp 11. As here shown, each head lamp is provided with two filaments 12 and 13. The filament 12 may be located in the focus of the parabolic reflector of the lamp 10 to constitute the normal driving light and filament 13 may be located slightly above the focus to direct the light more downwardly and constitute an intermediate driving light. The latter is desirably used when the vehicle is passing another car to prevent dazzling of the driver of the other car. In accordance with my invention, the two pairs of filaments are grounded to the chassis and are connected with the grounded battery C through a switch 14 for the chassis wiring.

The wire 33 electrically connects the switch 14 with the grounded filaments 12 of the head lamps 10, these filaments being arranged in parallel by the wires 33a connected to the wire 33. The wire 34 connects the switch 14 to the grounded filaments 13 of the head lamps, these filaments being arranged in parallel by the wires 34a connected to the wire 34. The wire 35 connects the switch 14 to the tail lamp 11. The wire 36 connects the grounded battery C to the switch 14. By a movable bridge (not shown) the wires 35 and 36 may be electrically connected when desired so as to place them both in electrical connection with the battery.

When a connection is made by a foot-operated alternating movable contact (not shown) between the wires 33 and 36 (the bridge being in bridging position to connect the wires 35 and 36) a circuit is established through the grounded battery, wire 36, wire 33, each of wires 33a, and the grounded filaments 12 of the head lamps 10, so that the normal driving lights of the car will be on. At the same time, a circuit is established through the grounded battery, wire 36, wire 35 and the grounded filament (not shown) of the tail lamp 11 and causing the tail light to be on. Similarly, when the position of the movable contact of the switch 14 is alternated to connect the wires 34 and 35, the circuits including the filaments 12 will be broken and a circuit established through the grounded battery, wire 36, wire 34, each of wires 34a and the grounded filaments 13 of the head lamps 10, causing the intermediate driving lights of the car to be on. At this time also, the wire 35 (being connected to the wire 36) will continue to be in circuit with the battery so that the tail light will continue to be on. Thus the tail light is desirably on when either the normal driving lights or the intermediate driving lights are on.

When it is desired to have no driving lights on, they may be cut out of circuit by moving the bridge (also foot-operated) to break the connection between each of the wires 35 and 36 and the switch 14, at which time the tail light would also be cut off if there were no other means for maintaining it in circuit than already described. I provide such means, however, as will be pointed out presently.

I have thus provided a group of circuits on the chassis of the automobile which are controlled by a foot-operated switch, which is preferably constructed in accordance with my co-pending application, Serial No. 568,669, filed October 14, 1931.

The body wiring next to be described provides a group of circuits controllable by a separated hand-operated switch.

The B, or body wiring, may include filaments 65 for the two parking lamps 66 (which may be located on the cowl of the vehicle), filament 67 for a dash lamp 68 (located in the vicinity of the instrument board), filament 69 for a service light such as the courtesy lamp 70. The latter may provide a light in the vicinity of the running board to guard against accidents at night in entering and alighting from the vehicle.

The filaments 65, 67 and 69 are grounded to the metal frame of the body of the vehicle (which constitutes a common ground with the chassis) and are connected with the one side of the grounded battery C through a switch 71 which is advantageously located on or near the dash board of the vehicle to be operated by hand. In the illustrative arrangement, the switch 71 is selective so that all of these filaments 65, 67 and 69 may be out of circuit or any one of them (considering the two filaments 65 as one) may be placed in circuit without the necessity of first lighting any other filament.

The hand-operated movable contact of switch 71 is in permanent electrical connection with one side of the grounded battery C by means of the insulated wire 97 which may have appropriately connected therein the ammeter 103. When now the movable contact of switch 71 is moved into engagement with, say the wire 88, a circuit is established through the grounded battery wire 113, the wire 97, switch 71, wire 88 and the grounded filament 69 of the courtesy lamp 70. Similarly, when the movable contact of switch 71 is moved into engagement with the wire 90, the former circuit is broken and a circuit is established through the grounded battery wire 113, wire 97, switch 71, wire 90 and the grounded filament 67 of the dash lamp 68.

When the movable contact of switch 71 is moved into engagement with the wire 89a it is also arranged to engage the wire 89. One circuit is therefore established through the grounded battery wire 113, wire 97, switch 71, wire 89, wire 112, wire 35 and grounded filament of tail light 11 and another circuit through the wire 89a, each of the wires 89b and the two grounded filaments 65 of the parking lights 66. When the switch 71 is moved into "off" position neither the courtesy, parking nor dash lights are on. The tail light, however, may be in circuit through chassis switch 14, as already described. The switch 71 is preferably constructed in accordance with my Patent No. 1,912,623, issued June 6, 1933.

The two groups of wiring A and B may be readily interconnected by any suitable means when the body of the vehicle is placed upon its chassis. For example, either the chassis or the body may carry an insulating connector block 108. The wires 89 and 97 may have metallic terminal plugs, such as the terminal 109 (Figure 2) of the wire 89, which is received in a metallic sleeve 110 which is passed through the connector block 108. From the opposite direction the sleeve 110 receives a similar plug 111 in which the wire 112 terminates, the latter being connected with the tail lamp 11 in any suitable manner as by being connected to the wire 35. Thus the connector block provides a circuit continuing device between the switch 71 and the tail light. Similarly the wire 97 and an wire 113 which is shown connected to the wire 36 may provide an electrical connection between the switch 71 and the battery C by being both received in another sleeve 110 in the block 108.

The sleeve 110 snugly receives the terminal plugs which are yieldingly retained therein as by means of detents 114 which are spring-pressed, as by the coil springs 115, into the bores of the sleeves 110 to snap into the annular grooves 116 at the base of the bulbous tips of the plugs.

My invention thus provides two groups of circuits, each group being controllable independently of the other and at the same time the wirings of the groups may be readily interconnected for operation from a common source of current and each of the controlling means controls one of the circuits of one of the groups, such as the tail light.

Moreover, the body circuits, which are usually desired to be operated when the car is standing still, are conveniently controlled by hand, while the chassis circuits, which usually are desired to be operated when the car is in motion, by the use of my invention are permitted to be controlled by the foot of the driver, thus advantageously leaving his hands entirely free for driving and other operating purposes.

Obviously, the invention is not limited to the details of arrangement shown for illustration. Furthermore, it is not indispensable that all the features of the invention be used conjointly, as various combinations and sub-combinations may be advantageously employed.

What I claim is:

1. The combination with an automotive vehicle having a chassis and a body; of a group of lighting circuits on the chassis including a tail light and two selective pairs of driving lights; a group of circuits on the body including parking lights; a common source of current; switching mechanism in controlling relation to the body circuit and connected with said source of current; means connecting the switching mechanism of the body circuit to the tail light; separate switching mechanism in controlling relation to the chassis circuits, said chassis switching mechanism selectively connecting the source of current with one of the pairs of driving lights; and means for connecting the chassis switching mechanism to the tail light, whereby the tail light is lighted in the circuit completing position of either or both the switching mechanisms.

2. The combination with an automotive vehicle having a chassis and a body; of a group of lighting circuits on the chassis including a tail light and two selective pairs of driving lights; a group of circuits on the body including parking lights; a common source of current; a hand operated switch in controlling relation to the body circuits and connected with said source of current; means connecting the switching mechanism of the body circuits to the tail light; a foot-operated switch in controlling relation to the chassis circuits, said chassis switch selectively connecting the source of current with one of the pairs of driving lights, and means for connecting the chassis switching mechanism to the tail light, whereby the tail light is lighted in the circuit completing position of either or both the switching mechanisms.

3. The combination with an automotive vehicle having a chassis and a body; of a group of lighting circuits on the chassis including a tail light and two selective pairs of driving lights; a group of circuits on the body including a pair of parking lights; a common source of current for the circuits; a hand operated switch in controlling relation with the body circuits, said body switch having a contact in permanent electrical connection with the source of current and a bridge member in permanent connection with the first contact and movable to simultaneously place in circuit therewith the tail light and parking lights; a foot operated switch in controlling relation with the chassis circuits, said chassis switch having a contact in normally permanent connection with the source of current and with the tail light and a movable member in permanent electrical connection with the first contact of the chassis switch and movable alternately to place in circuit therewith one or the other of the pairs of driving lights; and means for discontinuing the circuit from the source of current through the first mentioned contact of the chassis switch.

HARRY A. DOUGLAS.